United States Patent
Demirsoy et al.

(10) Patent No.: US 8,458,243 B1
(45) Date of Patent: Jun. 4, 2013

(54) DIGITAL SIGNAL PROCESSING CIRCUIT BLOCKS WITH SUPPORT FOR SYSTOLIC FINITE-IMPULSE-RESPONSE DIGITAL FILTERING

(75) Inventors: Suleyman Sirri Demirsoy, Ickenham (GB); Hyun Yi, San Jose, CA (US)

(73) Assignee: Altera Corporation, San Jose, CA (US)

( * ) Notice: Subject to any disclaimer, the term of this patent is extended or adjusted under 35 U.S.C. 154(b) by 707 days.

(21) Appl. No.: 12/716,378

(22) Filed: Mar. 3, 2010

(51) Int. Cl.
*G06F 7/38* (2006.01)
*G06F 7/32* (2006.01)

(52) U.S. Cl.
USPC ............ 708/522; 708/490; 708/523; 708/524

(58) Field of Classification Search
None
See application file for complete search history.

(56) References Cited

U.S. PATENT DOCUMENTS

| | | |
|---|---|---|
| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,597,053 A | 6/1986 | Chamberlin |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,967,160 A | 10/1990 | Quievy et al. |
| 4,982,354 A | 1/1991 | Takeuchi et al. |
| 4,994,997 A | 2/1991 | Martin et al. |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Amos, D., "PLD architectures match DSP algorithms " *Electronic Product Design*, vol. 17, No. 7, Jul. 1996, pp. 30, 32.

(Continued)

*Primary Examiner* — Scott Sun
(74) *Attorney, Agent, or Firm* — Ropes & Gray LLP; Jeffrey H. Ingerman

(57) ABSTRACT

Digital signal processing ("DSP") block circuitry on an integrated circuit ("IC") is adapted for use (e.g., in multiple instances of the DSP block circuitry on the IC) for implementing finite-impulse-response ("FIR") digital filters in systolic form. Each DSP block may include (1) first and second multiplier circuitry and (2) adder circuitry for adding (a) outputs of the multipliers and (b) signals chained in from a first other instance of the DSP block circuitry. Systolic delay circuitry is provided for either the outputs of the first multiplier (upstream from the adder) or at least one of the sets of inputs to the first multiplier. Additional systolic delay circuitry is provided for outputs of the adder, which are chained out to a second other instance of the DSP block circuitry.

12 Claims, 13 Drawing Sheets

U.S. PATENT DOCUMENTS

| | | | |
|---|---|---|---|
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,349,250 A | 9/1994 | New |
| 5,357,152 A | 10/1994 | Jennings, III et al. |
| 5,371,422 A | 12/1994 | Patel et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,522 A | 7/1997 | Moyse et al. |
| 5,646,545 A | 7/1997 | Trimberger et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,340 A | 3/2000 | Mintzer |
| 6,052,327 A | 4/2000 | Reddy et al. |
| 6,052,755 A | 4/2000 | Terrill et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,351,142 B1 | 2/2002 | Abbott |
| 6,359,468 B1 | 3/2002 | Park et al. |
| 6,362,650 B1 | 3/2002 | New et al. |
| 6,366,944 B1 | 4/2002 | Hossain et al. |
| 6,367,003 B1 | 4/2002 | Davis |

| | | | |
|---|---|---|---|
| 6,407,576 B1 | 6/2002 | Ngai et al. | |
| 6,407,694 B1 | 6/2002 | Cox et al. | |
| 6,438,570 B1 | 8/2002 | Miller | |
| 6,453,382 B1 | 9/2002 | Heile | |
| 6,467,017 B1 | 10/2002 | Ngai et al. | |
| 6,480,980 B2 | 11/2002 | Koe | |
| 6,483,343 B1 | 11/2002 | Faith et al. | |
| 6,531,888 B2 | 3/2003 | Abbott | |
| 6,538,470 B1 | 3/2003 | Langhammer et al. | |
| 6,542,000 B1 | 4/2003 | Black et al. | |
| 6,556,044 B2 | 4/2003 | Langhammer et al. | |
| 6,557,092 B1 | 4/2003 | Callen | |
| 6,571,268 B1 | 5/2003 | Giacalone et al. | |
| 6,573,749 B2 | 6/2003 | New et al. | |
| 6,574,762 B1 | 6/2003 | Karimi et al. | |
| 6,591,283 B1 | 7/2003 | Conway et al. | |
| 6,591,357 B2 | 7/2003 | Mirsky | |
| 6,600,788 B1 | 7/2003 | Dick et al. | |
| 6,628,140 B2 | 9/2003 | Langhammer et al. | |
| 6,700,581 B2 | 3/2004 | Baldwin et al. | |
| 6,725,441 B1 | 4/2004 | Keller et al. | |
| 6,728,901 B1 | 4/2004 | Rajski et al. | |
| 6,731,133 B1 | 5/2004 | Feng et al. | |
| 6,744,278 B1 | 6/2004 | Liu et al. | |
| 6,745,254 B2 | 6/2004 | Boggs et al. | |
| 6,774,669 B1 | 8/2004 | Liu et al. | |
| 6,781,408 B1 | 8/2004 | Langhammer | |
| 6,781,410 B2 | 8/2004 | Pani et al. | |
| 6,788,104 B2 | 9/2004 | Singh et al. | |
| 6,836,839 B2 | 12/2004 | Master et al. | |
| 6,874,079 B2 | 3/2005 | Hogenauer | |
| 6,904,471 B2 | 6/2005 | Boggs et al. | |
| 6,924,663 B2 | 8/2005 | Masui et al. | |
| 6,971,083 B1 | 11/2005 | Farrugia et al. | |
| 2001/0029515 A1 | 10/2001 | Mirsky | |
| 2002/0089348 A1 | 7/2002 | Langhammer | |
| 2003/0088757 A1 | 5/2003 | Lindner et al. | |
| 2004/0064770 A1 | 4/2004 | Xin | |
| 2004/0083412 A1 | 4/2004 | Corbin et al. | |
| 2004/0178818 A1 | 9/2004 | Crotty et al. | |
| 2004/0193981 A1 | 9/2004 | Clark et al. | |
| 2005/0144215 A1 | 6/2005 | Simkins et al. | |
| 2005/0166038 A1 | 7/2005 | Wang et al. | |
| 2005/0187999 A1 | 8/2005 | Zheng et al. | |
| 2005/0267926 A1* | 12/2005 | Al-Khoraidly et al. | 708/492 |
| 2006/0075012 A1 | 4/2006 | Minz et al. | |
| 2007/0185951 A1 | 8/2007 | Lee et al. | |
| 2007/0185952 A1 | 8/2007 | Langhammer et al. | |
| 2008/0133627 A1 | 6/2008 | Langhammer et al. | |
| 2010/0228806 A1* | 9/2010 | Streicher et al. | 708/203 |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 7-135447 | 5/1995 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO2005/101190 | 10/2005 |

OTHER PUBLICATIONS

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg. B.L., et al. "Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

"DSP Blocks in Arria GX Devices," Arria GX Device Handbook, vol. 2, pp. 10-1 through 10-32, Altera Corporation, San Jose, CA, May 2008.

"DSP Blocks in Stratix & Stratix GX Devices," Stratix Device Handbook, vol. 2, pp. 6-1 through 6-28, Altera Corporation, San Jose, CA, Jul. 2005.

"DSP Blocks in Stratix II and Stratix II GX Devices," Stratix II Device Handbook, vol. 2, pp. 6-1 through 6-34, Altera Corporation, San Jose, CA, Jan. 2008.

"DSP Blocks in Stratix III Devices," Stratix III Device Handbook, vol. 1, pp. 5-1 through 5-50, Altera Corporation, San Jose, CA, Oct. 2007.

"DSP Blocks in Stratix III Devices," Stratix III Device Handbook, vol. 1, pp. 5-1 through 5-40, Altera Corporation, San Jose, CA, May 2009.

"DSP Blocks in Stratix IV Devices," Stratix IV Device Handbook, vol. 1, pp. 4-1 through 4-44, Altera Corporation, San Jose, CA, May 2008.

"DSP Blocks in Stratix IV Devices," Stratix IV Device Handbook, vol. 1, pp. 4-1 through 4-34, Altera Corporation, San Jose, CA, Nov. 2008.

"DSP Blocks in Stratix IV Devices," Stratix IV Device Handbook, vol. 1, pp. 4-1 through 4-36, Altera Corporation, San Jose, CA, Nov. 2009.

"Embedded Multipliers in Cyclone III Devices," Cyclone III Device Handbook, vol. 1, pp. 5-1 through 5-8, Altera Corporation, San Jose, CA, Jul. 2007.

"Embedded Multipliers in Cyclone III Devices," Cyclone III Device Handbook, vol. 1, pp. 4-1 through 4-8, Altera Corporation, San Jose, CA, Jul. 2009.

Gaffar, A.A., et al., "Floating-Point Bitwidth Analysis via Automatic Differentiation," *IEEE Conference on Field Programmable Technology*, Hong Kong, Dec. 2002.

Guccione, S.A., "Run-time Reconfiguration at Xilinx " *Parallel and distributed processing: 15 IPDPS 2000 workshops*, Rolim, J., ed., May 1-5, 2000, p. 873.

Hauck, S., "The Future of Reconfigurable Systems " *Keynote Address, 5th Canadian Conference on Field Programmable Devices*, Jun. 1998, http://www.ee.washington.edu/people/faculty/hauck/publications/ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *Orca® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)* Oct. 21-24, 1996, pp. 275-279.

Jones, G., "Field-programmable digital signal conditioning " *Electronic Product Design*, vol. 21, No. 6, Jun. 2000, pp. C36-38.

Kiefer, R., et al., "Performance comparison of software/FPGA hardware partitions for a DSP application " *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA " *ISIE '99. Proceedings of the IEEE International Symposium on Industrial Electronics (Cat. No. 99TH8465)* vol. 3 , Jul. 12-16, 1999, pp. 1522-1525.

Langhammer, M., "How to implement DSP in programmable logic " *Elettronica Oggi*, No. 266 , Dec. 1998, pp. 113-115.

Langhammer, M., "Implementing a DSP in Programmable Logic " *Online EE Times*, May 1998, http://www.eetimes.com/editorial/1998/coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)* No. 233, 1998, pp. 2/1-2/4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)*, vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture " *RAWCON 2000: 2000 IEEE Radio and Wireless Conference (Cat. No. 00EX404)*, Sep. 10-13, 2000, pp. 135-138.

Parhami, B., "Configurable arithmetic arrays with data-driven control " *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)* vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)*, Jul. 26-28, 1999, pp. 147-150.

Stratix III Device Handbook, vol. 1, pp. 5-22 through 5-23, Altera Corporation, San Jose, CA, Nov. 2006.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

"Virtex-5 XtremeDSP Design Considerations," User Guide, UG193 (v1.3), pp. 71-72, Xilinx Corporation, Jul. 28, 2006.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication " *MathWorld—A Wolfram Web Resource* (Dec. 9, 2007), accessed Dec. 11, 2007 at http://mathworld.wolfram.com/KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http://www.iro.umontreal.ca/~aboulham/F6221/Xilinx%20A%201D%20systolic%20FIR.htm.

Xilinx, Inc., "The Future of FPGA's," White Paper, available Nov. 14, 2005 for download from http://www.xilinx.com/prs_rls,5yrwhite.htm.

"XtremeDSP for Spartan-3A DSP," User Guide, UG431 (v1.0), pp. 29-30, Xilinx Corporation, Apr. 2, 2007.

"XtremeDSP for Virtex-4 FPGAs," User Guide, UG073 (v2.4), pp. 35-36, Xilinx Corporation, Jan. 8, 2007.

\* cited by examiner $$y[n] = \sum_{i=1}^{k} c[i]\, x[n-i-1]$$

DIGITAL SIGNAL PROCESSING CIRCUIT BLOCKS WITH SUPPORT FOR SYSTOLIC FINITE-IMPULSE-RESPONSE DIGITAL FILTERING

BACKGROUND

This disclosure relates to digital signal processing ("DSP") circuitry, especially on integrated circuit ("IC") devices. More particularly, the disclosure relates to such DSP circuitry that is adapted to perform finite-impulse-response ("FIR") digital filtering.

DSP circuitry may be provided on an integrated circuit ("IC") in the form of multiple instances (identical or substantially identical repetitions) of a "block" of DSP circuitry. Such a "DSP circuit block" (or "DSP block") may be capable of several different DSP operations, and the block may be controllable to select which of the possible DSP operations the block performs in any particular application of the IC. For example, the IC may be a programmable logic device ("PLD"), a field-programmable gate array ("FPGA"), or other similar type of device that is manufactured as a relatively general-purpose product that a user can "customize" to perform the functions needed by that user's particular application of the device. Such customization may be by programming function control data into so-called configuration memory cells (configuration random access memory or "CRAM") on the device. After having been thus programmed or configured, the IC can enter its normal or user mode of operation, in which it performs the functions (e.g., the DSP functions) it has been programmed or configured to perform. Manufacturing such an IC with DSP blocks that can satisfy any of a wide range of possible user needs increases the number of users who can use the IC for their particular applications. This increases the size of the market for the IC, which can benefit the manufacturer; but increased sales volume can also help to lower the unit cost of the IC, which can benefit users of the IC.

A particularly advantageous form of relatively general-purpose DSP block circuitry includes two multiplier circuits that can be used either separately or together. Such an advantageous DSP block may also include the ability to feed its outputs (i.e., results of DSP operations it has performed) directly or substantially directly into another instance of the same DSP block circuitry on the IC for further processing in that "another" DSP block (so-called output chaining). Examples of such advantageous DSP block circuitry are shown in commonly assigned, concurrently filed Streicher et al. U.S. patent application Ser. No. 12/716,878, which is hereby incorporated by reference herein in its entirety. The just-mentioned Streicher et al. document will sometimes be referred to herein as "the Streicher et al. reference."

Among the possible applications of DSP block circuitry of the type mentioned above is in the performance of finite-impulse-response ("FIR") digital filtering. FIR filtering typically involves passing successive input signal samples through a series of delay circuits, each of which delays each sample applied to it by the time duration of any one sample in the input sample stream. The just-mentioned "time duration" is typically the "period" or time duration of an "operating cycle" of the circuitry, or the period of a clock signal that is used to control the rate of such operating cycles. Each input sample and each sample output by each delay circuit in a given operating cycle of the circuitry is multiplied by a respective filter coefficient value, and all of the resulting multiplication products are added together to produce the output of the FIR filter for that operating cycle.

A possible problem associated with FIR filter circuitry is that it can take a relatively long time to complete the addition of a significant number of the above-mentioned multiplication product values. This can necessitate lengthening the operating cycle of the circuitry (accomplished by slowing down the clock that controls the speed of the circuitry). With the modern emphasis on rapid circuit operation, this can be undesirable.

As a possible way to ameliorate the adverse effects of long addition time, the so-called systolic form of FIR filter circuitry has been developed. This is circuitry with additional ("systolic") delay in both the input sample delay chain and the product-summing chain. Because a user of DSP circuit blocks of the type mentioned above may want to use them to implement systolic form FIR filters, a need exists for efficient ways to include systolic delays (or registers) in such DSP blocks.

Providing DSP circuitry on an IC (especially ICs like PLDs, FPGAs, and the like) in the form of a plurality of DSP blocks (always meaning multiple instances of identical or substantially identical instances of DSP module circuitry) can be advantageous and desirable for several reasons. Among these reasons are design efficiency (e.g., because the design of one DSP block (or DSP module) can be replicated several times on the IC). Another benefit may be the ability of a user of the IC to put together (i.e., use in an interconnected way) any number of such DSP blocks on the IC to perform a DSP function that is larger than can be performed in one DSP block by itself. Only as many DSP blocks as are needed are thus put together, and any other DSP blocks on the IC remain available for other purposes. Still another advantage of DSP blocks is that they may include circuitry that is dedicated to performing DSP operations (rather than being more completely general-purpose circuitry). Such DSP block circuitry can therefore perform DSP operations more efficiently. However, if a DSP block is not optimized for implementing systolic FIR filters, it can be necessary to use circuitry outside of the DSP blocks to complete the systolic FIR filter implementation. For example, more general-purpose adder circuitry outside the DSP blocks may be needed to sum multiplication products output by multiple DSP blocks. Use of such more general-purpose adder circuitry, etc., outside of the DSP blocks can be inefficient. This leads to a need for DSP blocks that are better adapted for more completely implementing systolic FIR filters, especially systolic FIR filters that can be of any size and that can avoid use of general-purpose ("soft") adder circuitry external to the DSP blocks.

SUMMARY

In accordance with certain possible aspects of the disclosure, digital signal processing ("DSP") block circuitry on an integrated circuit ("IC") is adapted for use (e.g., in multiple identical or substantially identical instances of the DSP block circuitry on the IC) for implementing finite-impulse-response ("FIR") digital filters in systolic form. Each DSP block may include (1) first and second multiplier circuitry and (2) adder circuitry for adding (a) multiplication product data indicated by output signals of the multipliers and (b) chained-in data indicated by signals chained in from a first other instance of the DSP block circuitry. Systolic delay circuitry is provided for either the output signals of the first multiplier (prior to application of those output signals to the adder) or for at least one of the sets of inputs to the first multiplier. Additional systolic delay circuitry is provided for outputs of the adder, which are chained out to a second other instance of the DSP block circuitry.

Further features of the disclosure, its nature and various advantages will be more apparent from the accompanying drawings and the following detailed description.

DETAILED DESCRIPTION

As mentioned above, FIR filters are widely used in DSP applications. The basic structure of a FIR filter includes a series of multiplications followed by an addition. A FIR filter operation can be represented by the equation shown in FIG. 1. In this equation, $x[n-i-1]$ represents the sequence of successive input samples (each such sample being, e.g., a digital (binary) data word of N bits presented in parallel (where N may be a number like 18, for example)). Also in the FIG. 1 equation, $c[i]$ represents the filter coefficients (e.g., other digital data words, the bits of each of which (for example, N bits again) are also presented in parallel), and k−1 is the number of "taps" that the filter has (e.g., the number of multiplications beyond the first multiplication that the filter has).

Figures 1, 2:
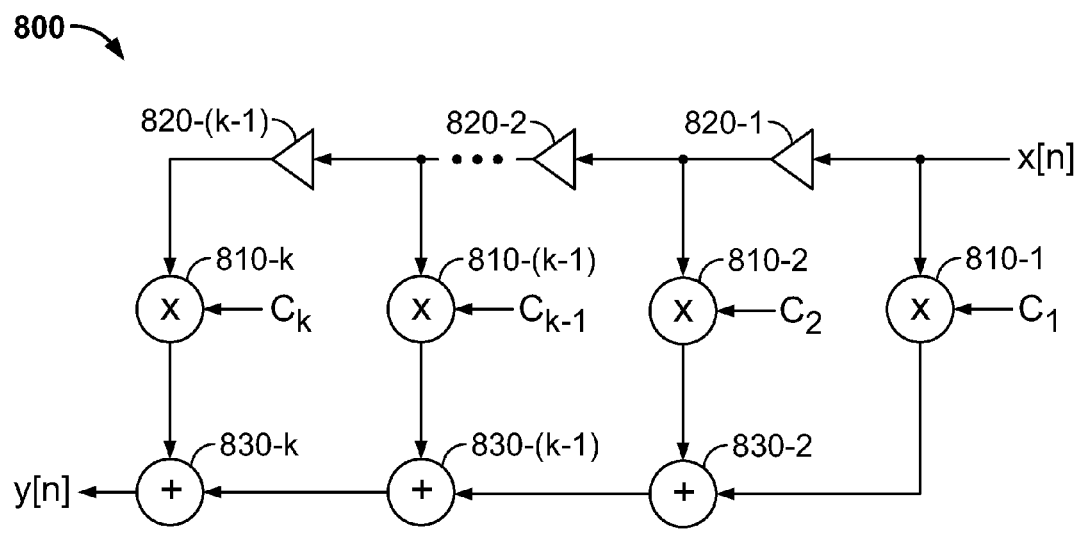
FIG. 1 shows a known equation for a finite-impulse-response ("FIR") digital filter function.
FIG. 2 is a simplified schematic block diagram of illustrative, known circuitry for implementing the FIG. 1 function.

FIG. 2 shows typical circuitry 800 for implementing (in so-called "direct form") the FIR filter equation shown in FIG. 1. In this FIG., elements 820-1 through 820-(k−1) are a series of delay circuit elements (e.g., registers or flip-flops), each of which delays the input sample applied to it by one operating cycle of the circuitry. (As noted earlier, such an "operating cycle" is typically the time duration of each successive sample x[n] in the input sample stream. This "time duration" is also typically the period (length in time) of one cycle in a clock signal that controls the timing of various events throughout the circuitry. For example, that clock signal may be used to control when each of delay circuit elements is enabled to store and subsequently output the data sample applied to its inputs.)

Each of elements 810 in FIG. 2 is multiplier circuitry. For example, each such multiplier 810 is typically able to perform a parallel or substantially parallel multiplication of two parallel data words that are presented to it concurrently in order to produce parallel output signals indicative of the product of that multiplication. Illustratively, if each sample x[n] is represented by N parallel binary signals, and if each filter coefficient c[i] is also represented by N parallel binary signals, then each of multipliers 810 may be circuitry for performing an N×N multiplication (in parallel or substantially in parallel) to produce a product of 2N parallel binary signals. As can be seen in FIG. 2, each successive multiplier 810-1 through 810-k operates on each successive input sample x[n] after that sample has been delayed by passing through increasingly more of delay elements 820. Thus, for example, multiplier 810-1 operates on each input sample x[n] with no delay between x[n] and multiplier 810-1.

However, multiplier 810-2 operates on each input sample x[n] after each sample has been delayed by one operating cycle of the circuitry (due to the delay that results from passing each sample through delay element 820-1). This pattern continues until at the last tap of filter 800, multiplier 810-k operates on each input sample x[n] after that sample has been delayed by k−1 operating cycles of the circuitry (due to the delay that results from passing each sample through the full series (or succession) of delay circuit elements 820-1 through 820-(k−1).

Each of elements 830 in FIG. 2 is adder circuitry. For example, each such adder 830 is typically able to perform a parallel or substantially parallel addition of the two parallel data words that are applied to it concurrently or substantially concurrently to produce a parallel sum output data word. Thus, for example, adder 830-2 adds the products output by multipliers 810-1 and 810-2. The next adder 830-3 (not shown) in the series or chain of adders 830 adds the sum produced by adder 830-2 and the product produced by the next multiplier 810-3 (not shown). At the end of the adder chain, adder 830-k produces the filter outputs y[n] by adding the sum produced by adder 830-(k−1) and the product produced by multiplier 810-k.

As was mentioned in the Background section of this specification, it can take a relatively long time for a relatively long chain of adders 830 (each operating on relatively long data words (e.g., 2N-bit data words, where N is 18, for example)) to produce a final result y[n] from all of its many inputs. (In fact, adders 830 typically need to be even larger than 2N bits to avoid loss of information due to adder overflow as multiple 2N-bit products are added together.) Possible undesirable consequences of such relatively slow performance of a long chain of adders are discussed in the Background section of this specification.

Figure 3:
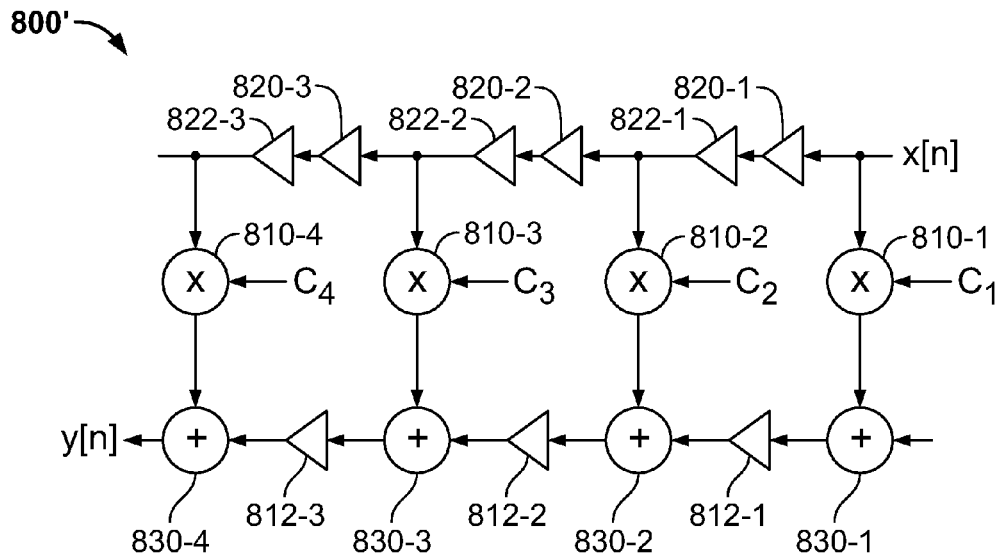
FIG. 3 is a simplified schematic block diagram of an illustrative systolic form of the FIG. 2 circuitry.

As a possible way to eliminate the need for a long chain of adders (or other very large adder) in FIR filters, the so-called systolic form of such filters has been developed. The typical systolic form of a FIR filter 800 (now reference-numbered 800') is shown in FIG. 3. (FIG. 3 is made a bit more uniform from tap to tap by additionally showing adder 830-1. FIG. 3 is also made easier to explain by showing, in full, four immediately adjacent taps (e.g., four immediately adjacent multipliers 810-1 through 810-4). It will be understood, however, that the structure shown in FIG. 3 can be continued (to the left as viewed in the FIG.) to provide a systolic FIR filter having any desired number of taps.)

As compared to FIG. 2, in the systolic form FIR filter 800' shown in FIG. 3, additional delay elements 812 and 822 are placed per tap to increase the performance of the filter (e.g., the speed at which the filter circuitry can be clocked, thereby increasing its operating cycle speed) at the cost of increased latency (i.e., the time delay between when a particular input data sample x[n] is presented to the filter and when the corresponding output sample y[n] is available from the filter). In particular, in systolic FIR filter 800' each successive adder 830 in the adder chain is separated from the preceding adder in the chain by a respective systolic delay element (or systolic registers) 812. Thus, for example, the sum produced by adder 830-1 must pass through systolic delay element 812-1 before being applied to the adder 830-2 in the adder chain. Also in systolic filter 800', each successive delay element 820 in the chain of elements that successively delay samples in the input data stream x[n] is followed (or alternatively could be preceded) by a respective systolic delay element (or systolic registers) 822. In other words, instead of there being only one delay element 820 between the inputs to each pair of successive taps, there are now two such delay elements. As an example, there are now two delay elements 820-1 and 822-1 between the inputs to the taps that include multipliers 810-1 and 810-2. All of delay elements 812, 820, and 822 preferably have the same amount of delay (i.e., one operating or clock cycle of the circuitry).

Including delay elements 812 in the adder chain in filter 800' prevents the adder chain from having to add together a large number of adder inputs in one operating cycle of the circuitry. In each operating cycle, each adder 830 only has to add two inputs, and the one of those two inputs that comes from the next-upstream adder 830 was produced by that upstream adder during the preceding operating cycle (not earlier in the same operating cycle in which it is needed by the downstream adder).

Systolic delay elements 822 are provided in the input data sample stream path to keep the propagation of input samples through that path synchronized with the propagation of sum-of-product data through the chain of adders 830. Thus, each systolic register 812 that is added between a pair of adjacent filter taps is "matched" by a "corresponding" or "associated" systolic delay element 822 between the taps in that pair.

For convenience herein, a systolic FIR filter of the general type shown in FIG. 3 (i.e., a systolic FIR filter having systolic delay 812 and 822 between each of the adjacent multipliers 810 in the filter) may sometimes be referred to as a "type 1 systolic FIR filter" or the like.

Figure 4:
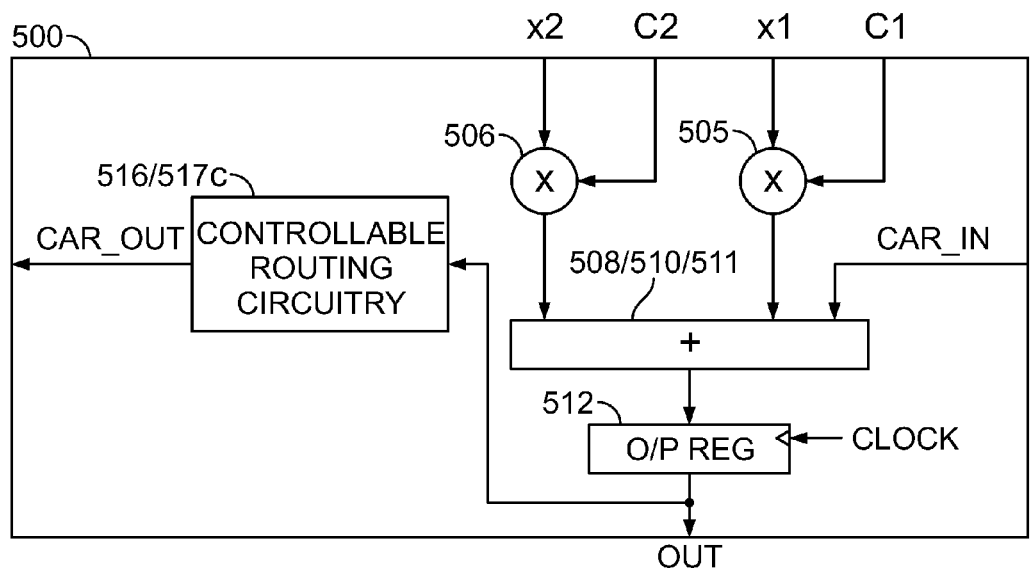
FIG. 4 is a simplified schematic block diagram of an illustrative embodiment of DSP block circuitry that can be modified in accordance with this disclosure.

As noted in the Background section of this specification, it can be desirable to provide DSP circuitry on an integrated circuit in the form of multiple repetitions (or instances) of a particular form of module (or block) of such circuitry. The above-mentioned Streicher et al. reference shows advantageous examples of such DSP block or module circuitry, some of which exemplary modules include (inter alia) two multipliers, adder circuitry, and routing circuitry that can be used to route certain outputs of one DSP circuit block directly or substantially directly into another DSP circuit block (e.g., that is adjacent to the first-mentioned block). A simplified depiction of a representative one of such DSP circuit blocks 500 is shown in FIG. 4. It is emphasized that, as compared to what is shown in the Streicher et al. reference, FIG. 4 omits several elements and alternatively usable functions that may also be included in DSP block 500. This is done to help focus this discussion on only the elements that are especially relevant to the present disclosure.

As shown in FIG. 4, representative DSP circuit block 500 includes multipliers 505 and 506, each of which can be circuitry for performing an N×N multiplication (with N being a number, for example, like 18). For example, multiplier 505 can multiply an N-bit, parallel, input data word x1 by another N-bit, parallel, input data word C1; and multiplier 506 can multiply an N-bit, parallel, input data word x2 by another N-bit, parallel, input data word C2.

DSP block 500 further includes adder circuitry 508/510/511, which can be used to add together the products output by multipliers 505 and 506, and also to add into that sum "car_in" signals cascaded or chained in from another (typically adjacent) instance of DSP block circuitry 500 (e.g., to the right of the DSP block that is depicted in FIG. 4).

DSP block 500 still further includes output registers 512 for registering the output signals of adder circuitry 508/510/511 in synchronism with a clock signal. The output signals of registers 512 can be the normal output signals ("out") of the DSP block. For example, these normal output signals can go to relatively general-purpose routing or interconnection resources on the IC that includes block 500 for routing to other (e.g., more general-purpose) circuitry on (or off) the IC. In addition, the output signals of output registers 512 are applied to controllable routing circuitry 516/517c that is part of DSP block 500. Routing circuitry 516/517c can select the output signals of registers 512 to be the so-called "car_out") signals of block 500. These car_out signals are preferably directly or substantially directly connected to the car_in inputs of another (typically adjacent) DSP block 500. Such "direct" or "relatively direct" inter-DSP-block connections may be referred to as "dedicated" connections or the like. Such dedicated connections are only usable for conveying signals between DSP blocks 500. They are therefore different from the more general-purpose interconnection or routing resources of the IC, which more general-purpose resources can be used (as has already been mentioned) to convey signals like "out," x1, and x2 more generally to, from, and between various kinds of circuitry on the IC.

Figure 5:
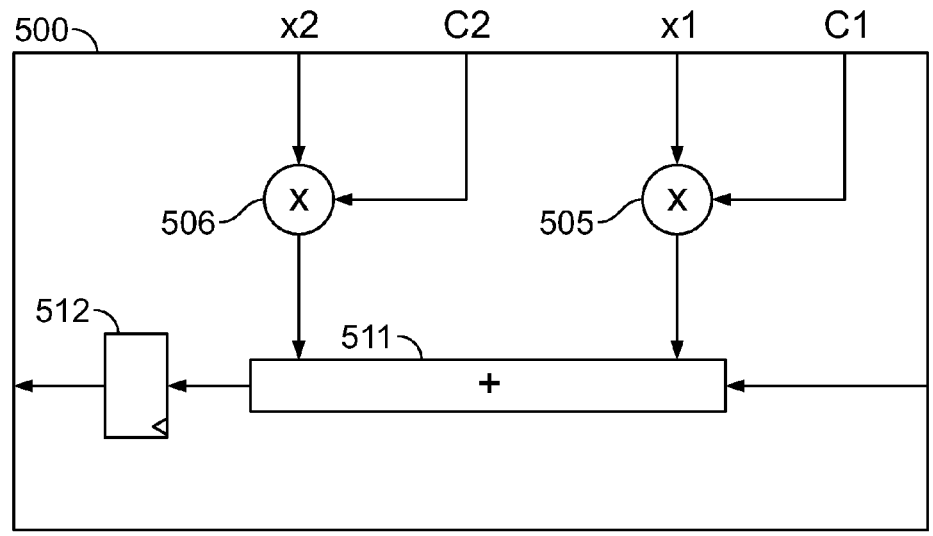
FIG. 5 is a more streamlined depiction of the FIG. 4 circuitry.

A more streamlined depiction of what is shown in FIG. 4 is shown in FIG. 5. This more streamlined depiction shows the same representative DSP circuit block 500 as is shown in FIG. 4, but reduces the elements actually shown to only those that will be needed for further discussion of systolic form FIR filters herein. In particular, in FIG. 5 reference to the adder circuitry is simplified by using only the reference number 511, and output registers 512 are shown as flip-flops 512 (a typical implementation of registers). As in FIG. 4, the leads exiting block 500 on the left in FIG. 5 preferably connect directly (i.e., via dedicated connections) to leads in another (preferably adjacent) instance of DSP block 500. These last-mentioned leads are like the leads shown entering the right side of the FIG. 5 DSP block.

Figure 6:
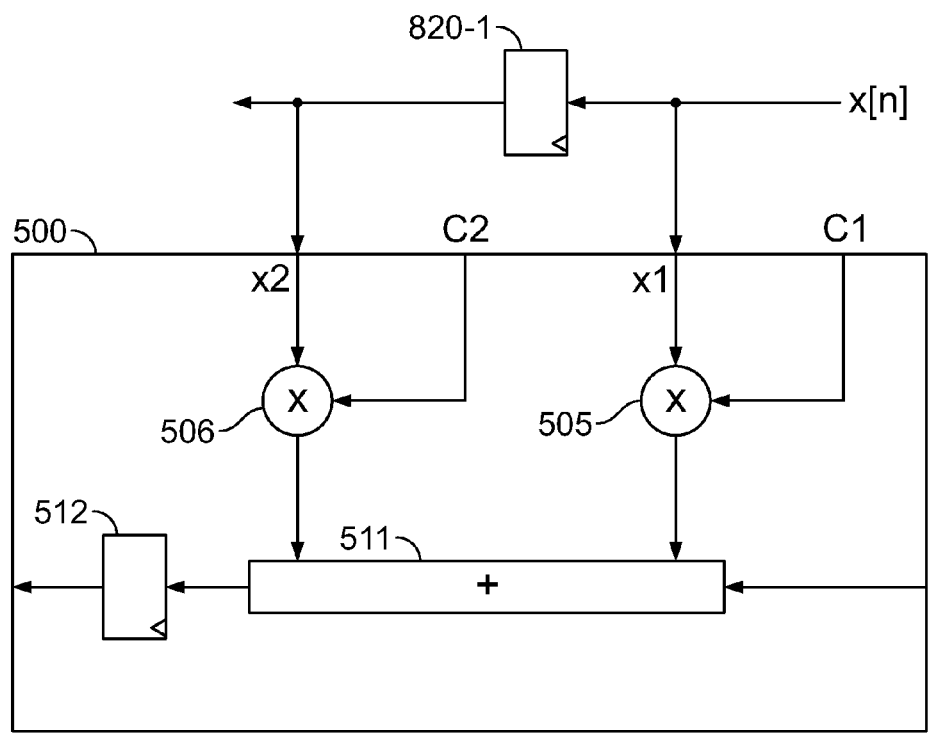
FIG. 6 is a simplified schematic block diagram of an illustrative use of the FIG. 5 circuitry in implementation of a FIR filter.

The DSP circuit block 500 shown in FIG. 5 can implement two adjacent taps in a direct form FIR filter. This is illustrated by FIG. 6, which shows registers 820-1 (which may be external to DSP block 500 but elsewhere on the IC that includes block 500) being used to provide the necessary delay of input samples x[n] between the x1 inputs to multiplier 505 and the x2 inputs to multiplier 506. (As a possible alternative to registers 820-1 being external to DSP block 500, those registers could instead be part of (i.e., within) DSP block 500 (see, for example, later-discussed FIGS. 15 and 16).) Each of multipliers 505 and 506 performs the multiplication required for a respective one of the two adjacent taps of the FIR filter, and adder 511 adds the resulting products to produce the required sum-of-products from those two taps.

Figure 7:
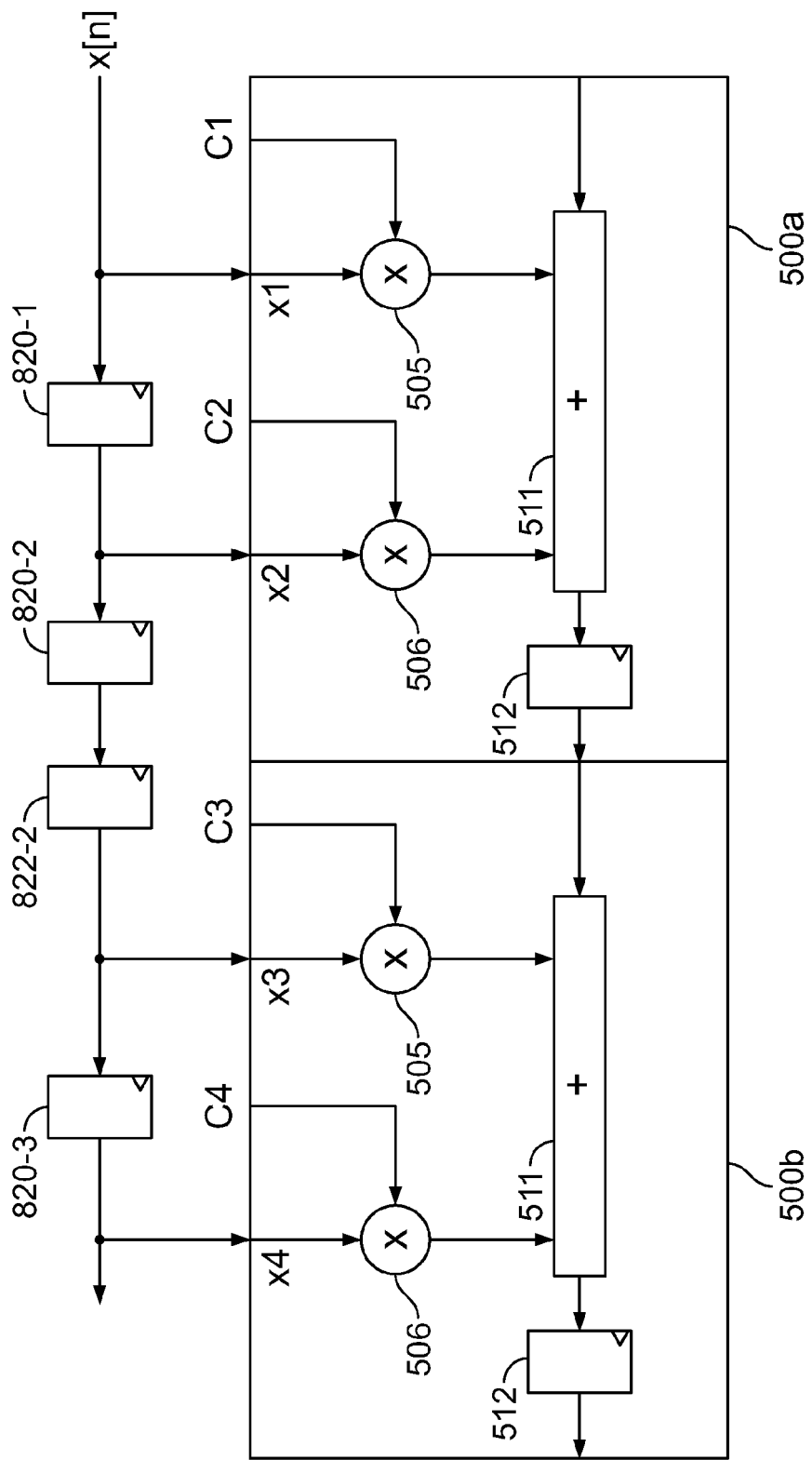
FIG. 7 is a simplified schematic block diagram showing multiple instances of the FIG. 6 circuitry in implementation of more extensive FIR filter operations.

Multiple (typically adjacent) instances of DSP block 500 can implement a systolic form of multiple adjacent pairs of adjacent FIR filter taps. For example, FIG. 7 shows two adjacent DSP blocks 500a and 500b implementing four adjacent taps of a partly systolic form of FIR filter. Registers 820-1 (external to the DSP blocks) provide the required input sample delay between the first two taps (as in above-described FIG. 6). (Registers 820-1 could instead be internal to DSP block 500a.) Registers 512 in DSP block 500a now operate to provide systolic delay between the outputs of adder 511 in block 500a and the chained application of those outputs to adder 511 in block 500b. Registers 820-2 (again external to the DSP blocks) provide the required input sample delay between the second and third taps (x2 in DSP block 500a and x3 in DSP block 500b, respectively). (Registers 820-2 could instead be internal to DSP block 500a.) Registers 822-2 (also external to the DSP blocks) provide additional systolic delay of the input samples between the second and third taps to equal the systolic delay (of the partial sum-of-products) provided by registers 512 in block 500a. (Registers 822-2 could instead be internal to DSP block 500b.) Registers 820-3 (again external to the DSP blocks) provide the required input sample delay between the third and fourth taps (respectively the x3 and x4 inputs to multipliers 505 and 506 in DSP block 500b). (Registers 820-3 could instead be internal to DSP block 500b.) Adder 511 in DSP block 500b adds the systolically delayed sum of products from the first two taps (chained in from DSP block 500a) to the third and fourth tap products generated in block 500b to produce a final output of the four-tap, systolic, FIR filter.

For convenience herein, a systolic FIR filter of the general type shown in FIG. 7 (i.e., a systolic FIR filter having systolic delay between each of adjacent pairs of multipliers in the filter) may sometimes be referred to as a "type 2 systolic FIR filter" or the like. In other words, a type 2 systolic FIR filter has systolic delay only between adjacent pairs of multipliers, not between each of the adjacent multipliers (as is the case for a type 1 systolic FIR filter such as is shown in FIG. 3). Thus in FIG. 7 there is no systolic delay between the multipliers within each DSP block 500a or 500b. However, there is systolic delay between the second multiplier 506 in DSP block 500a and the first multiplier 505 in DSP block 500b. That makes the systolic FIR filter shown in FIG. 7 a type 2 systolic FIR filter as that phrase is defined and employed herein.

Figure 8:
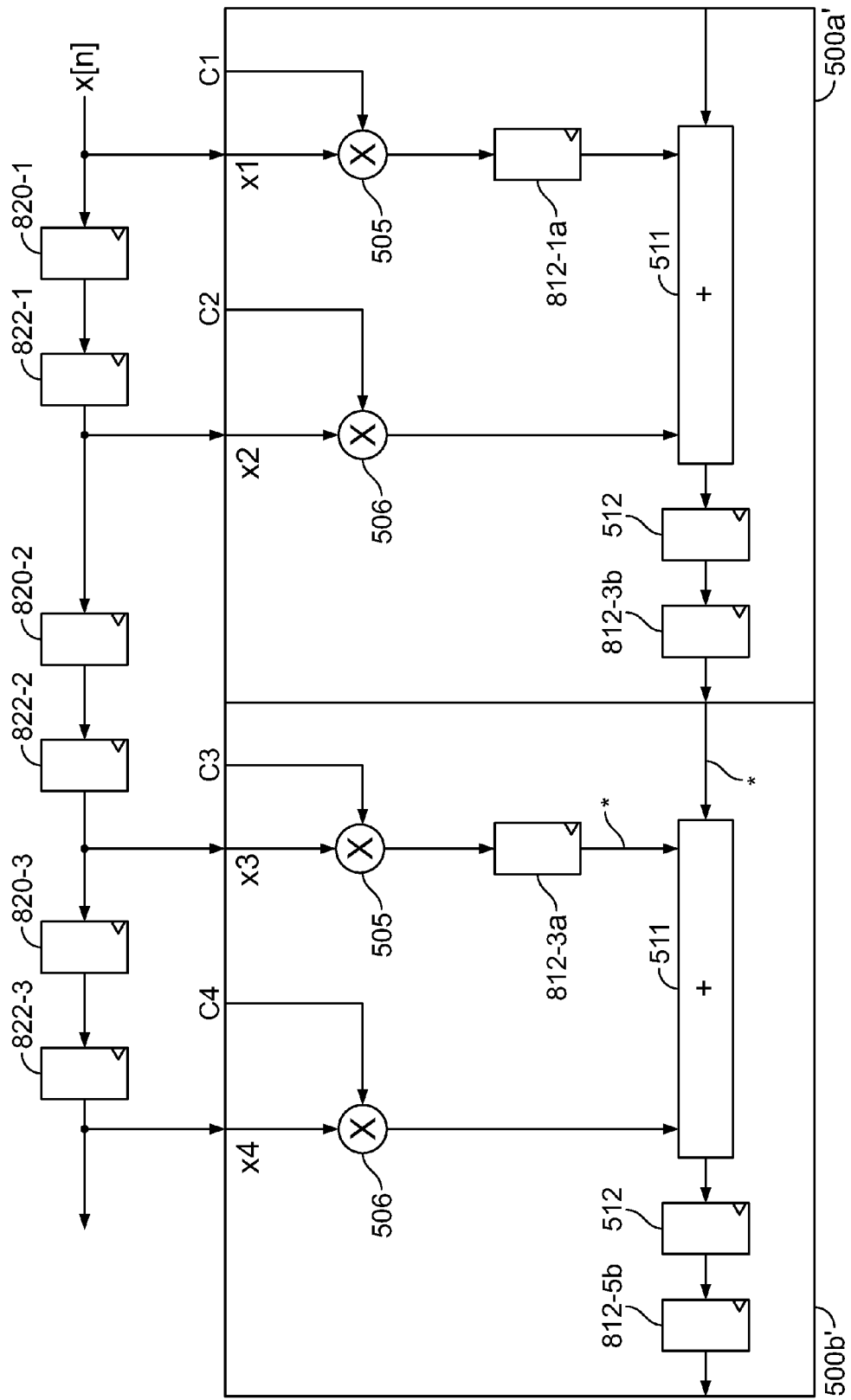
FIG. 8 is a simplified schematic block diagram showing an illustrative embodiment of modification of the FIG. 7 circuitry to implement a fully systolic FIR filter function in accordance with certain possible aspects of this disclosure.

Although FIG. 7 shows that DSP circuit blocks 500 can implement type 2 systolic FIR filters, DSP blocks 500 cannot implement type 1 systolic FIR filters (including two taps per block 500) because without the addition of more systolic registers in accordance with this disclosure, DSP blocks 500 have no way to provide systolic delay between the two taps (multipliers) that are implemented within one such DSP block. FIG. 8 shows an illustrative embodiment (in accordance with certain possible aspects of this disclosure) of a DSP circuit block 500' that can be used to implement type 1 systolic FIR filters (with two taps of the filter being implemented in each block 500'). FIG. 8 actually shows two (adjacent) instances 500a' and 500b' of such a DSP block 500'. This is done to facilitate comparison with FIG. 7.

As compared to a DSP circuit block 500, each of DSP circuit blocks 500a' and 500b' (generically DSP block 500') in FIG. 8 includes optionally usable systolic registers 812-1a or 812-3a between the multiplier 505 and the adder 511 in each block, and optionally usable systolic registers 812-3b or 812-5b in the chaining output path downstream from the output registers 512 in each block. (Alternatively, these last-mentioned systolic registers could be upstream from the associated output registers 512.) Considering, for example, the two sets of inputs to adder 511 in block 500b' that are marked "*": including systolic registers 812-3a and 812-3b in the paths to those inputs is functionally similar to the systolic delay 812-3 shown in FIG. 3. In other words, adder 511 in DSP block 500b' in FIG. 8 is not broken or interrupted by any internal systolic delay like 812-3 between adders 830-3 and 830-4 in FIG. 3. But a similar systolic delay effect is produced in FIG. 8 by introducing systolic delays 812-3a and 812-3b into the inputs (marked "*") to adder 511 in block 500b' that are equivalent to the inputs to adder 830-3 in FIG. 3.

In addition to the systolic delay that has thus been added within each DSP block 500', systolic delay registers 822-1 or 822-3 are also included (external to the DSP blocks) in the input sample delay chain between the two sets of sample inputs to each block. (Registers 822-1 could instead be internal to DSP block 500a', and registers 822-3 could instead be internal to DSP block 500b'.) Each FIR filter tap in FIG. 8 is thus now separated from the immediately preceding FIR filter tap by the same amount of systolic delay. In particular, the systolic delay between the first and second taps is provided by systolic registers 812-1a and 822-1; the systolic delay between the second and third taps is provided by registers 512 in block 500a' (acting like delay element 812-2 in FIG. 3) and systolic registers 822-2; and the systolic delay between the third and fourth taps is provided by systolic registers 812-3a, 812-3b, and 822-3.

Figure 9:
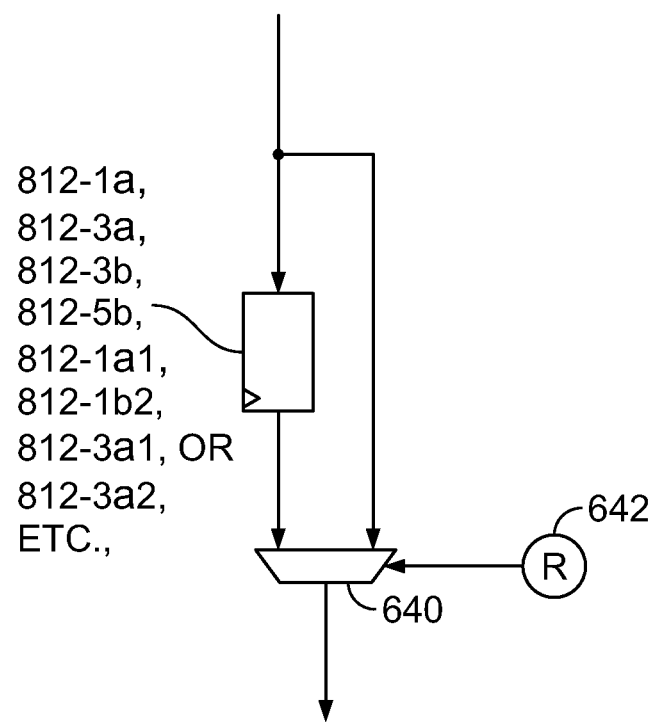
FIG. 9 is a simplified schematic block diagram of an illustrative embodiment of an implementation of certain elements in FIG. 8 (and certain subsequent FIGS.) in accordance with certain possible aspects of the disclosure.

All systolic registers that are added to a DSP circuit block in accordance with this disclosure (e.g., registers 812-1a, 812-3a, 812-3b, and 812-5b in FIG. 8 and any other similar systolic registers that are added to DSP blocks in subsequent FIGS.) are preferably controllably bypassable. For example, FIG. 9 shows an illustrative embodiment of circuitry for selectively (controllably, optionally) bypassing any of the above-mentioned systolic registers in FIG. 8 or subsequent FIGS. As shown in FIG. 9, the inputs to representative systolic register circuitry 812-1a, etc., are also applied to one of the selectable sets of inputs to representative multiplexer ("mux") circuitry 640. The outputs of register circuitry 812-1a, etc., are applied to the other selectable set of inputs to mux 640. Mux 640 is controlled by the logical state (e.g., logic 1 or logic 0) of a selection control signal from circuit element 642. For example, element 642 may be a CRAM cell on the IC that includes the other circuitry shown herein. The logical state of the selection control signal from element 642 determines which one of the two sets of selectable input signals to mux 640 are output by the mux. Thus if the signal from element 642 causes mux 640 to output the inputs it receives from the outputs of systolic registers 812-1a, etc., then those systolic registers are in use in the circuitry. On the other hand, if the signal from element 642 causes mux 640 to output the inputs it receives from its connections to the inputs of registers 812-1a, etc., then those systolic registers are bypassed (not used). Use or non-use of the systolic registers added to DSP blocks in accordance with this disclosure is therefore optional. Such an option may be controlled by a user of the IC, e.g., by user control of how circuit element 642 is configured (programmed).

Use of registers like 820 and 822 in the input sample delay chain is typically also optional. In the embodiments shown thus far herein, these registers are in more general-purpose circuitry that is preferably on the IC with the DSP circuit blocks but outside of those blocks themselves. The user is preferably free to select any of wide range of signal routings in this general-purpose circuitry. Therefore, which signals are applied to the various general-purpose inputs (like x1, C1, x2, C2, etc.) to the DSP blocks, and how those signals get to those inputs, is preferably subject to user control to a large extent. This means, for example, that the user can include any desired number and arrangement of delay elements like 820 and 822 in a chain of circuit elements for delaying input samples x[n]. Alternatively, the circuitry may be put to some other, altogether different use that does not involve any chaining of input samples. Thus again, the inclusion or non-inclusion in the circuitry of any particular register 820 or 822 is typically among several options selected by the user of the circuitry.

(We have already mentioned the alternative of including input sample delay chain registers and input sample systolic registers in the DSP blocks like 500, 500a/b, and/or 500a'/b'. If that is done, then any or all of those registers are preferably optionally usable. This principle (which is illustrated by later-described FIGS. 15 and 16) also applies to all similar registers shown in subsequent FIGS. herein.)

Figure 10:
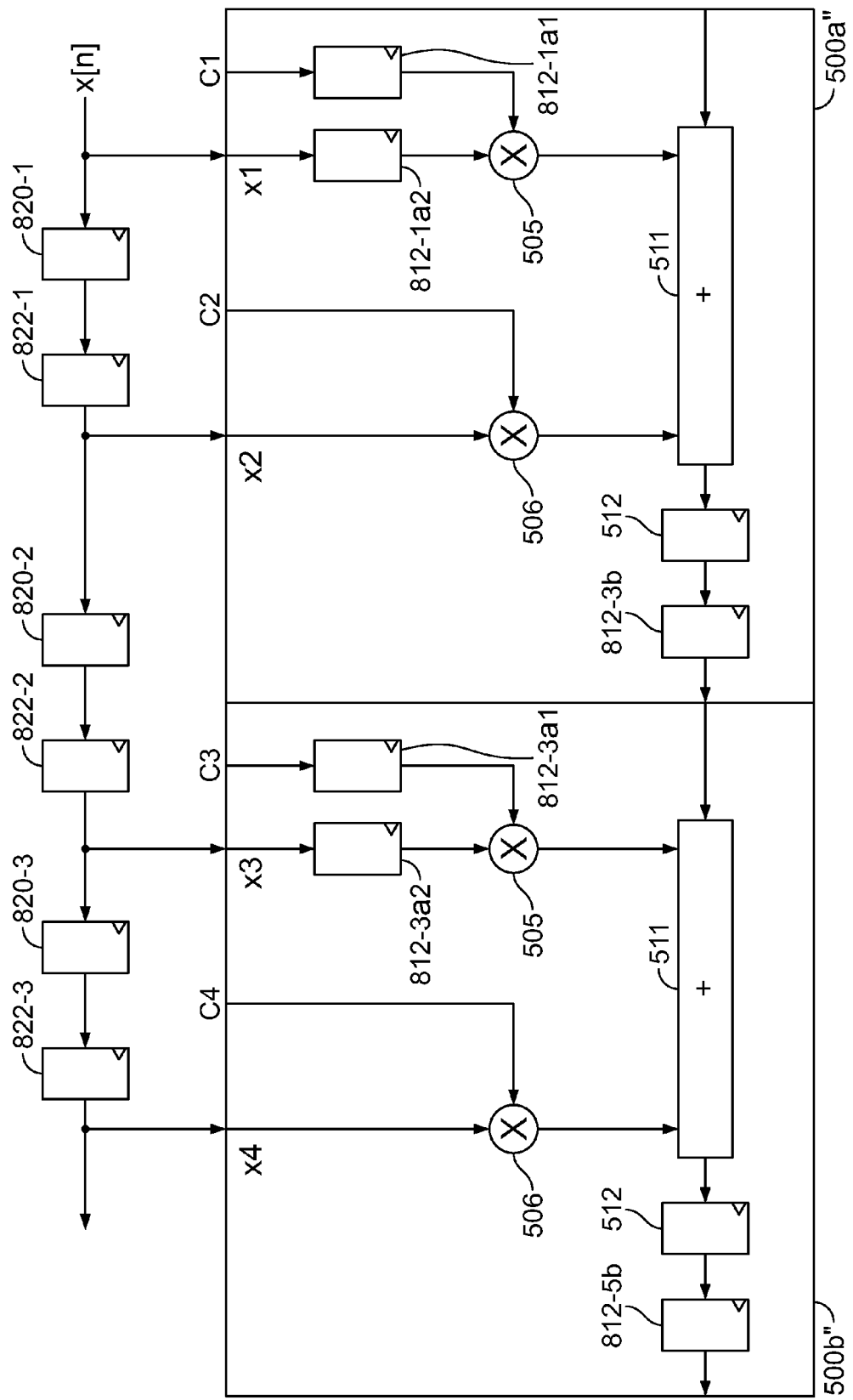
FIG. 10 is simplified schematic block diagram showing another illustrative embodiment of modification of the FIG. 7 circuitry to implement a fully systolic FIR filter function in accordance with certain possible aspects of the disclosure.

FIG. 10 shows an alternative embodiment of what is shown in FIG. 8. In FIG. 10 the function of systolic registers 812-1a (operating on the outputs of multiplier 505 in DSP block 500a' in FIG. 8) is moved upstream to operate on the inputs to multiplier 505 in DSP block 500a". In particular, in FIG. 10, systolic registers 812-1a1 operate on the C1 inputs to multiplier 505 in block 500a", and systolic registers 812-1a2 operate on the x1 inputs to that multiplier. Systolic delay of both inputs to multiplier 505 has a functional effect similar to systolic delay of the outputs from the multiplier (as in FIG. 8). The same change in systolic register location is also implemented in DSP block 500b" in FIG. 10. In particular, systolic registers 812-3a1 and 812-3a2 now effectively take the place of systolic registers 812-3a in FIG. 8.

The FIG. 10 circuitry implements the same type of systolic FIR filter as the FIG. 8 circuitry, namely, a type 1 systolic FIR filter.

Locating systolic registers 812-1a and 812-3a as shown in FIG. 10 can help to reduce the required number of such registers. For example, multipliers 505 may be constructed to produce two vectors of output signals indicative of the product formed by that multiplier. These two vectors may be so-called redundant form multiplier product vectors (i.e., one vector of redundant form sum bits and one vector of redundant form carry bits). (Eventually these two redundant form vectors are combined in downstream compressor/adder circuitry 511 so that the final multiplier data is derived from them. See, for example, the above-mentioned Streicher et al. reference.) Assuming that each multiplier 505 in FIG. 10 performs an N×N multiplication, then each multiplier outputs a redundant form sum vector of 2N bits and a redundant form carry vector of 2N bits. The number of systolic registers 812-1a or 812-3a needed by each multiplier 505 in FIG. 8 is therefore 4N registers. But the number of systolic registers needed for each input to each multiplier 505 is only N registers, for a total of only 2N registers for each multiplier 505 in FIG. 10. The alternative embodiment shown in FIG. 10 can therefore require fewer systolic registers than the FIG. 8 embodiment. In other respects, however, the embodiments of FIGS. 8 and 10 are functionally similar to one another and function similarly to one another.

Figure 11:
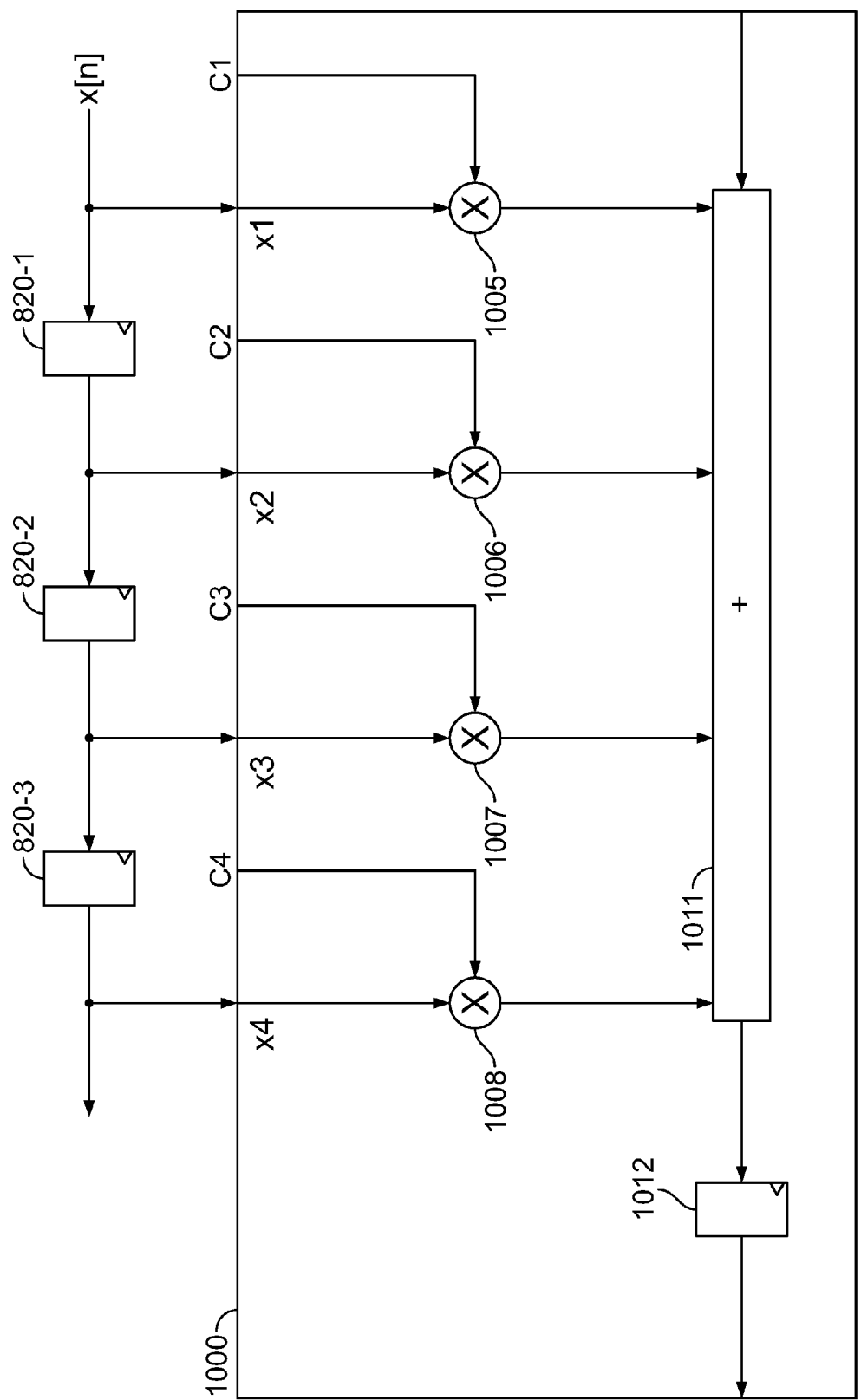
FIG. 11 is a simplified schematic block diagram of another illustrative embodiment of DSP block circuitry that can be modified in accordance with this disclosure.

Up to this point this disclosure has primarily considered DSP blocks 500 that are able, inter alia, to form the sum of two products. However, the principles of this invention are also applicable to DSP blocks that can form the sum of more than two products. FIG. 11 shows an example of a DSP block 1000 that can form the sum of four multiplications with chainout. FIG. 11 shows DSP block 1000 being used to implement four adjacent taps of a FIR filter. In particular, multiplier 1005 performs the multiplication for the first tap, multiplier 1006 performs the multiplication for the second tap, multiplier 1007 performs the multiplication for the third tap, and multiplier 1008 performs the multiplication for the fourth tap. Adder circuitry 1011 adds the products produced by all of the multipliers. Adder circuitry 1011 can also include in that sum any input chained in from another (typically adjacent) instance of block 1000 (e.g., located to the right of the depicted block). Output registers 1012 register the sum produced by adder 1011. The outputs of register 1012 can (inter alia) be chained out to another (typically adjacent) instance of block 1000 (e.g., located to the left of the depicted block).

Figure 12:
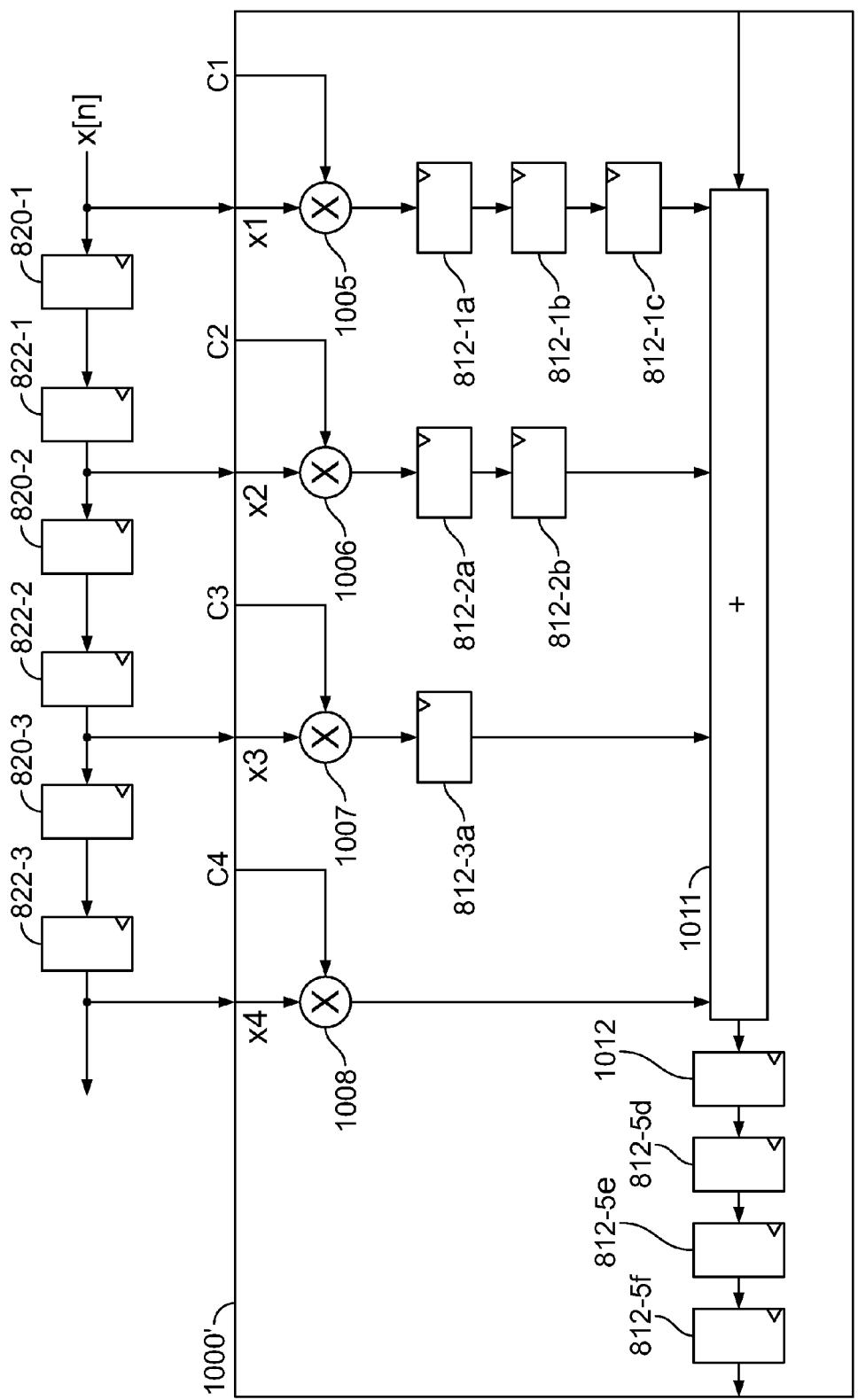
FIG. 12 is a simplified schematic block diagram of an illustrative embodiment of modification of the FIG. 11 circuitry in accordance with certain possible aspects of the disclosure.

FIG. 12 shows modification of DSP block 1000 for type 1 systolic FIR filter operation in accordance with this disclosure if desired. In particular, in modified DSP circuit block 1000' systolic registers 812-1a, 1b, and 1c are added in series between multiplier 1005 and adder 1011 to give those multiplier outputs three operating cycles of systolic delay before they enter adder 1011. Systolic registers 812-2a and 2b are added in series between multiplier 1006 and adder 1011 to give those multiplier outputs two operating cycles of systolic delay before they enter adder 1011. Systolic registers 812-3a are added between multiplier 1007 and adder 1011 to give those multiplier outputs one operating cycle of systolic delay before they enter adder 1011. Systolic registers 812-5d, 5e, and 5f are added in series downstream from registers 1012 to give the chained outputs of DSP block 1000' three additional cycles of systolic delay prior to those chained outputs entering the next instance (not shown) of DSP block 1000' to the left of the depicted instance. External to DSP block 1000' the input sample delay chain can be identical to the corresponding portion of FIG. 8. (Alternatively, this input sample delay chain can be internal to DSP block 1000'.) It will be apparent from the earlier discussion how the systolic registers 812 that are included in DSP block 1000' give that DSP block type 1 systolic operation.

Figure 13:
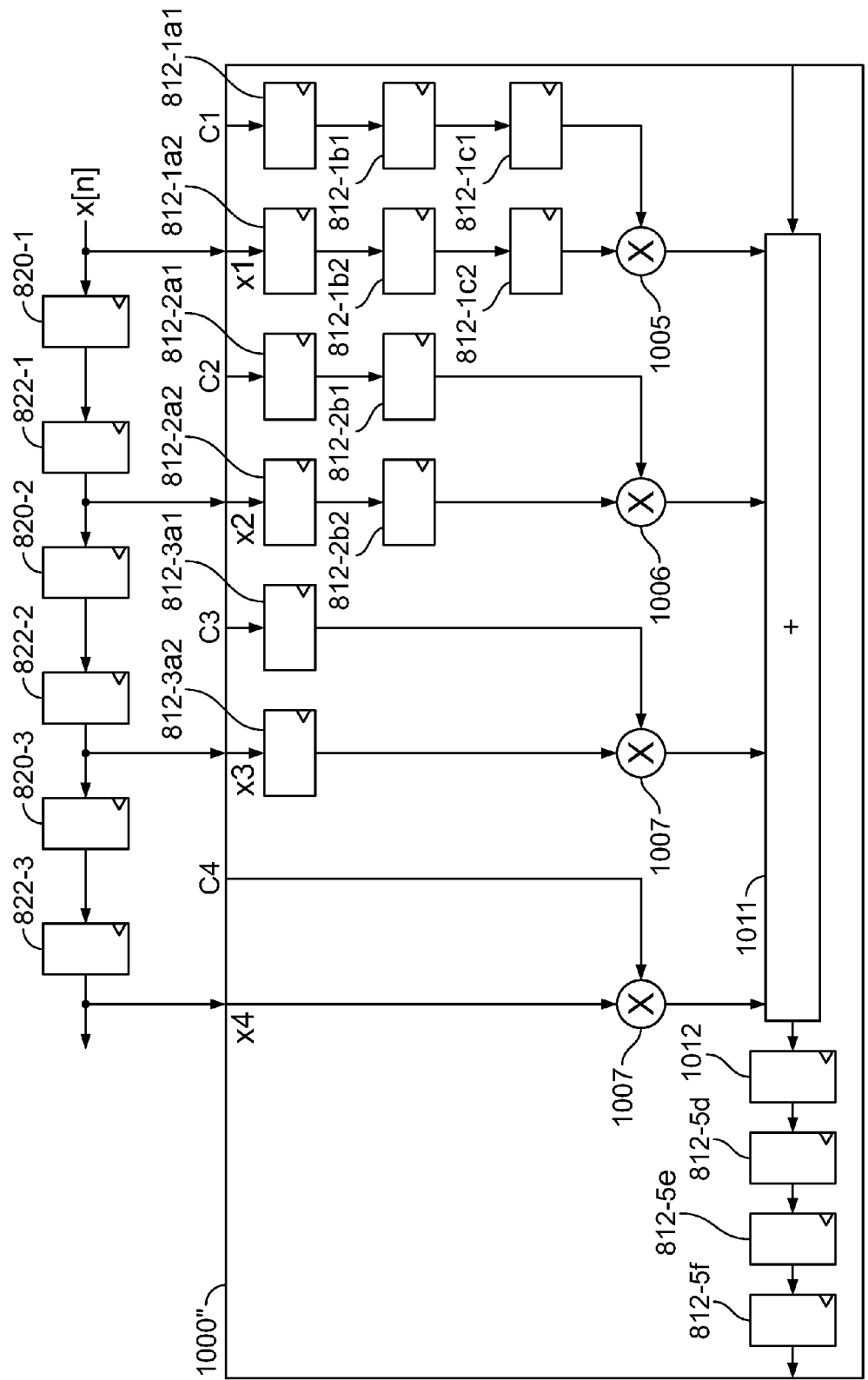
FIG. 13 is similar to FIG. 12 for another illustrative embodiment of modification of the FIG. 11 circuitry in accordance with certain possible aspects of the disclosure.

FIG. 13 shows an alternative embodiment of the FIG. 12 circuitry that is analogous to how FIG. 10 is an alternative to FIG. 8. In DSP circuit block 1000" (FIG. 13), the functions performed by systolic registers 812-1a, 1b, and 1c are moved upstream to the inputs to multiplier 1005. Thus FIG. 13 shows a series of three systolic registers 812-1a1, 1b1, and 1c1 operating on one set of the inputs to multiplier 1005, and another series of three systolic registers 812-1a2, 1b2, and 1c2 operating on the other set of inputs to multiplier 1005. The functions performed (in FIG. 12) by systolic registers 812-2a and 2b are similarly moved upstream in FIG. 13 to two series of systolic registers 812-2a1/2b1 and 812-2a2/2b2 operating, respectively, on each of the two sets of inputs to multiplier 1006. Lastly, the functions performed (in FIG. 12) by systolic registers 812-3a are moved upstream in FIG. 13 to two groups of systolic registers 812-3a1 and 812-3a2 operating, respectively, on the two sets of inputs to multiplier 1007. It will be apparent from earlier discussions herein that the systolic operation of the FIG. 13 circuitry is similar to the systolic operation of the FIG. 12 circuitry. It will also be apparent from those earlier discussions how the FIG. 13 circuitry may reduce the number of systolic registers required as compared to the FIG. 12 circuitry.

In connection with embodiments like those shown in FIG. 10 and FIG. 13, it should be noted that if each filter coefficient C1, C2, C3, C4, etc., is expected to be constant over the course of a filtering operation, it may not be necessary to include systolic delay elements like 812-1a1 and 3a1 (FIG. 10) or 812-1a1, 1b1, 1c1, 2a1, 2b1, and 3a1 (FIG. 13) in the circuitry. If each such filter coefficient always has the same value, its timing or synchronization with other data is irrelevant, and it therefore does not need any systolic delay. The systolic delay elements listed in this paragraph can therefore be omitted from the circuitry.

Figure 14:
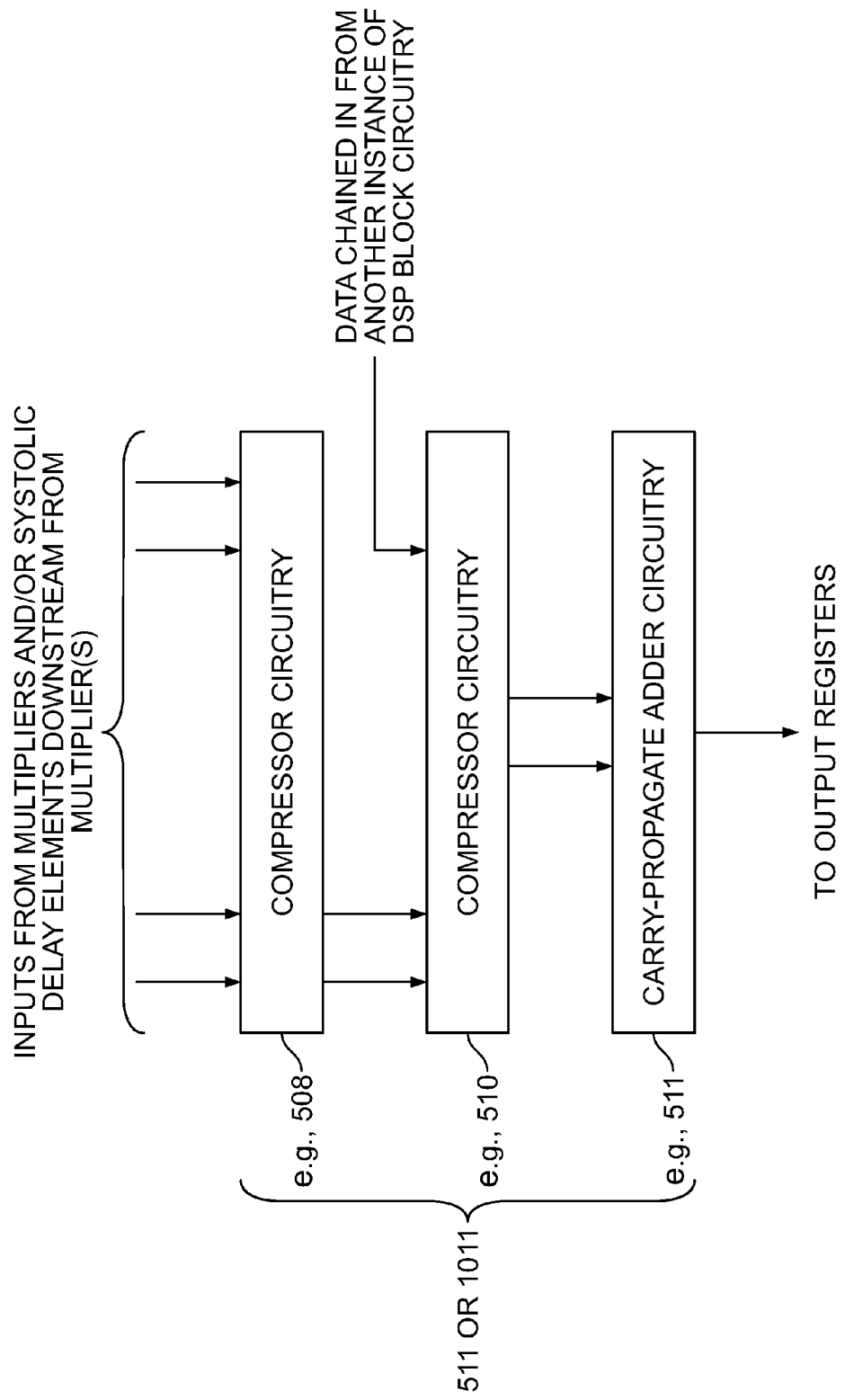
FIG. 14 is a simplified schematic block diagram of an illustrative implementation of certain elements in various other FIGS.

For completeness it may be helpful to appreciate that the various adders (e.g., like 511 and 1011) shown herein may have a construction like that shown in FIG. 14 (see also the above-mentioned Streicher et al. reference). In this type of construction, relatively upstream compressor circuitry 508 additively combines outputs from all of the multipliers in a DSP block 500', 500'', 1000', or 1000'' (possibly after some of those multiplier outputs have passed through systolic delay circuitry like 812-1a in FIG. 8 or 812-1a, 1b, and 1c in FIG. 12). All of this local multiplier data is combined together for application to more downstream, further, compressor circuitry 510, which additively combines the outputs of circuitry 508 and data chained in from another instance of the DSP block circuitry in the IC. The outputs of circuitry 510 may be applied to carry-propagate adder ("CPA") circuitry 511 to produce the final outputs of the adder circuitry. For example, some of the signals upstream from CPA 511 in FIG. 14 may be redundant form sum and carry vectors, a pair of which must be combined in order to produce a final binary data word. CPA 511 can perform that combining of a sum vector and a carry vector applied to it from the circuitry upstream from the CPA.

A purpose for including FIG. 14 is to show that the adder circuitry in a DSP block may additively combine local (i.e., intra-DSP-block) multiplier output information with no opportunity for including systolic delay circuitry within the adder circuitry. For example, assuming that compressor circuitry 508 is additively combining output information from multipliers 505 and 506 in any earlier FIG., circuitry 508 does not readily accommodate within itself elements for introducing systolic delay of the feed from multiplier 505 relative to the feed from multiplier 506. This is a motivation for employing systolic delay elements elsewhere in the circuitry in accordance with this disclosure.

Figure 15:
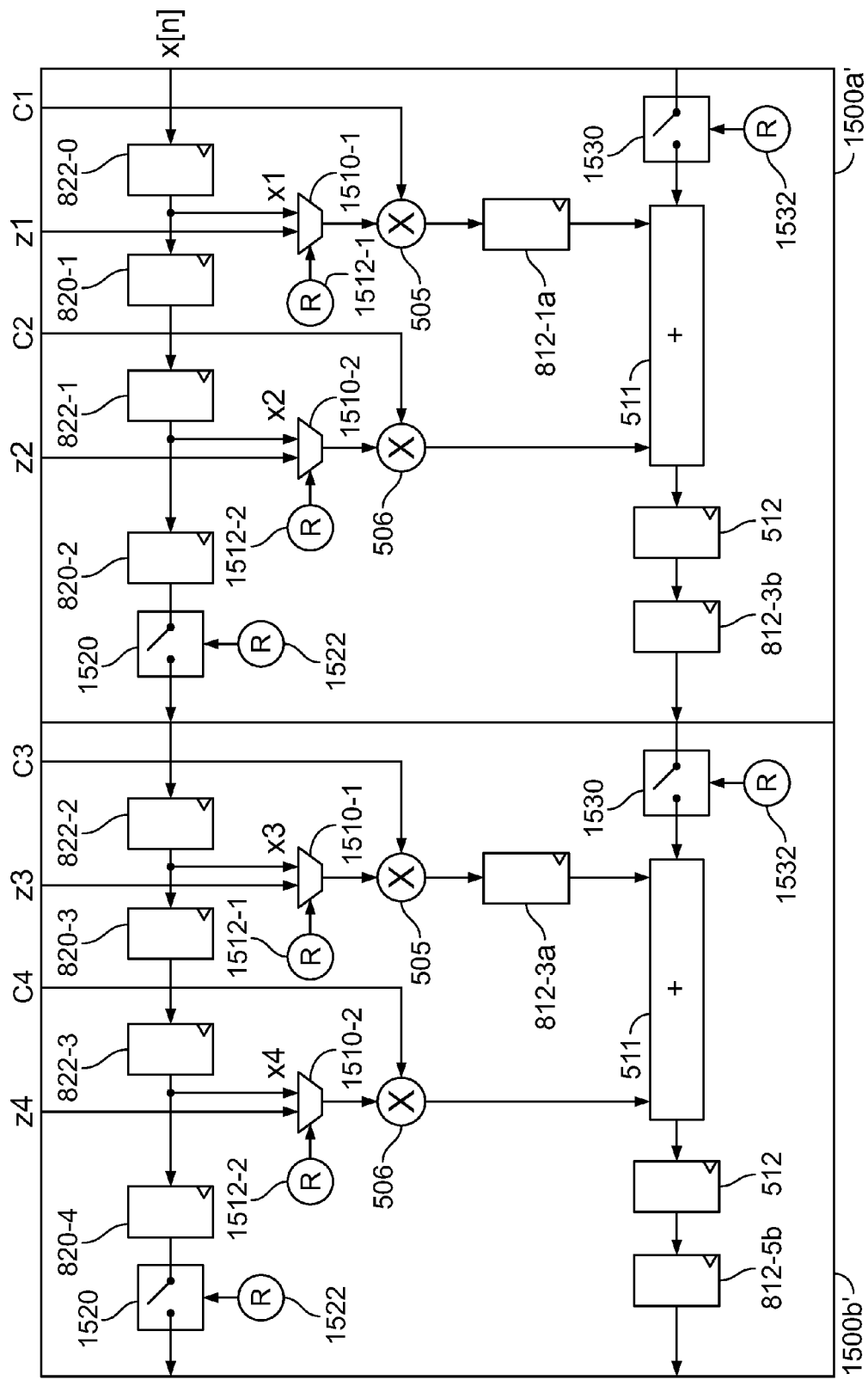
FIG. 15 is a simplified schematic block diagram of an illustrative embodiment of modification of the FIG. 8 circuitry in accordance with certain possible aspects of the disclosure.
Figure 16:
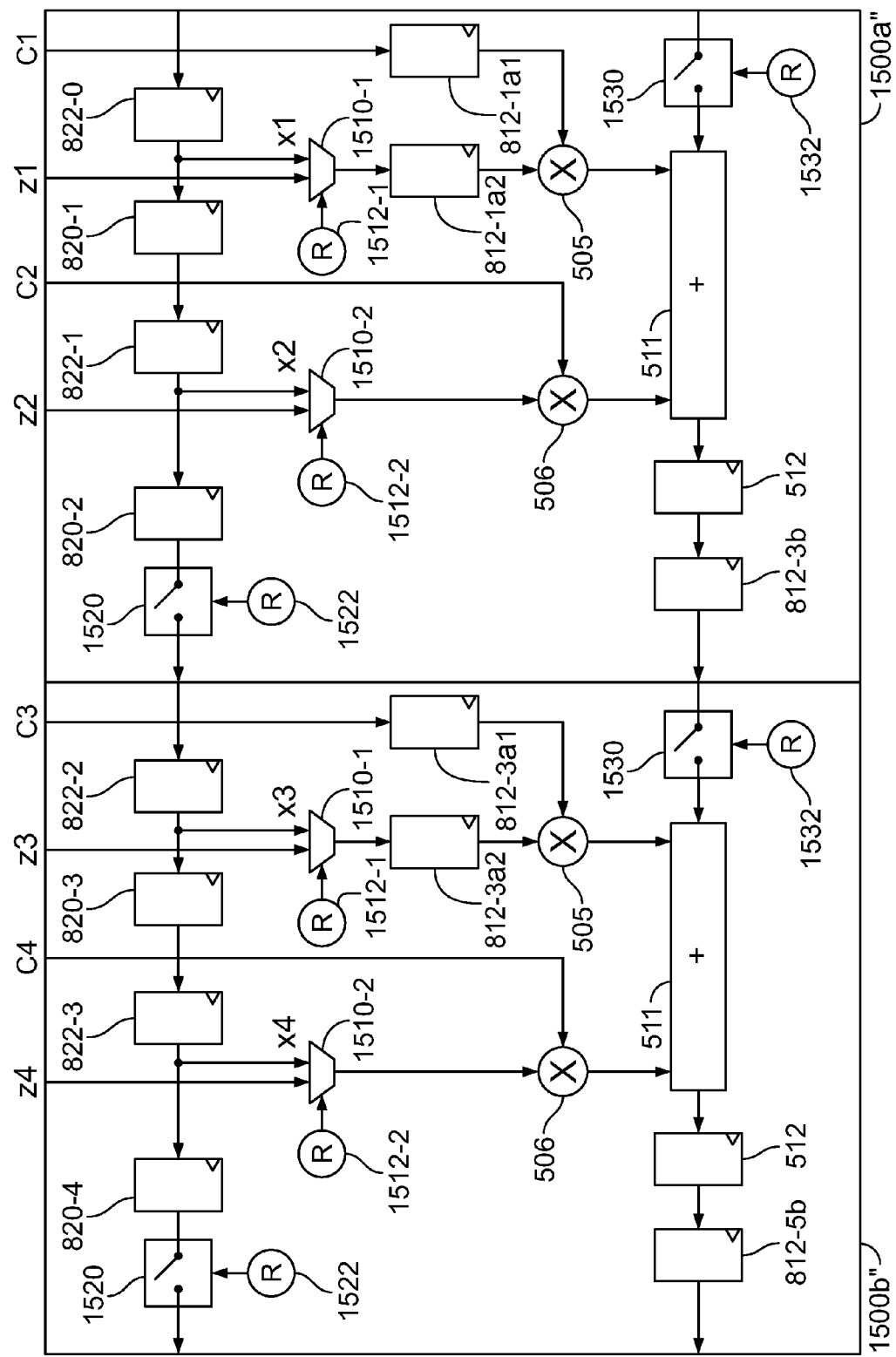
FIG. 16 is a simplified schematic block diagram of an illustrative embodiment of modification of the FIG. 10 circuitry in accordance with certain possible aspects of the disclosure.

FIG. 15 shows an alternative embodiment of what is shown in FIG. 8 in which sample delay chain registers 820-1 and 820-2 and sample systolic delay registers 822-0 and 822-1 are included within DSP block 1500a' (otherwise similar to DSP block 500a'). Similarly, FIG. 15 shows inclusion of sample delay chain registers 820-3 and 820-4 and sample systolic delay registers 822-2 and 822-3 within DSP block 1500b' (otherwise similar to DSP block 500b'). Thus FIG. 15 illustrates a type of alternative construction of DSP blocks that has already been mentioned earlier in this specification. FIG. 16 illustrates the type of alternative shown in FIG. 15, but now applied to circuitry that is otherwise similar to FIG. 10. Thus in FIG. 16 the DSP blocks are 1500a'' and 1500b'', and except for the inclusion of delay registers 820 and 822 within the DSP blocks, these DSP blocks are respectively similar to DSP blocks 500a'' and 500b'' in FIG. 10. The principle illustrated by FIGS. 15 and 16 can also be applied to circuitry like that shown in FIGS. 12 and 13 if desired.

To preserve the more general usability of the DSP blocks shown in FIG. 15 (e.g., for uses other than systolic FIR filtering), those DSP blocks are shown as being able to alternatively get their multiplicands (similar to above-described values x1, x2, x3, etc.) from sources other than the delay chain circuitry 820/822. Thus, for example, the multiplicand input to multiplier 505 in DSP block 1500a' can be controllably selected by multiplexer ("mux") circuitry 1510-1 in that DSP block to be either x1 from delay chain circuitry 820/822 or z1 from a source external to DSP block 1500a' (e.g., the more general-purpose signal routing circuitry on the IC that includes the DSP circuitry). The selection (i.e., between x1 and z1) made by mux 1510-1 can be controlled by a selection control signal from circuit element 1512-1 (e.g., a CRAM element on the IC (similar to other CRAM elements described herein)). Similar elements 1510 and 1512 are provided for all of the multiplicand inputs in FIG. 15 (and similarly also in FIG. 16). Additional elements for preserving flexibility of use of the FIG. 15 DSP blocks are the controllable switches 1520 provided in the input sample delay chain 820/822, and the similar controllable switches 1530 provided in the product-accumulation chain from each adder 511 to the next adder 511. Switches 1520 allow the sample delay chain to either continue or not continue from one DSP block 1500' to the next DSP block 1500', depending on whether or not those switches are closed (e.g., under the control of CRAM elements 1522). Similarly, switches 1530 allow the product accumulation chain to either continue or not continue from one block 1500' to the next, depending on whether or not those switches are closed (e.g., under control of CRAM elements 1532). FIG. 16 similarly shows inclusion of elements 1520, 1522, 1530, and 1532.

It will be understood that functions like those implemented by elements 1510/1512, 1520/1522, and/or 1530/1532 can be implemented in other ways and/or by other means without departing from the scope and spirit of the disclosure. It will also be understood that elements 1510/1512, 1520/1522, and/or 1530/1532 (or other circuit structures or arrangements that implement similar functions) can be included in any of the other embodiments shown and described herein. The same is true for other principles that are illustrated by FIGS. 15 and 16.

To some extent recapitulating and extending the foregoing, digital signal processing ("DSP") block circuitry (e.g., 500b' in FIG. 8) in accordance with certain possible aspects of the disclosure may include first multiplier circuitry (e.g., 505) for producing a first plurality of parallel output signals indicative of a first multiplication product. The DSP block circuitry may further include first systolic delay circuitry (e.g., 812-3a) for delaying the first plurality of parallel output signals by a systolic delay time interval. The DSP block circuitry may still further include second multiplier circuitry (e.g., 506) for producing a second plurality of parallel output signals indicative of a second multiplication product. The DSP block circuitry may yet further include adder circuitry (e.g., 511) for adding (1) outputs of the first systolic delay circuitry (e.g., 812-3a), (2) the second plurality of parallel output signals, and (3) a third plurality of parallel signals (e.g., from 812-3b) indicative of a data value received from a first other instance (e.g., 500a') of said DSP block circuitry.

In DSP block circuitry such as recapitulated above, the adder circuitry 511 may produce a fourth plurality of parallel signals (e.g., outputs to 512) indicative of a sum from the adding. In such a case, the DSP block circuitry may further include output register circuitry (e.g., 512) for registering the fourth plurality of parallel signals. Still further in such a case, the DSP block circuitry may still further include second systolic delay circuitry (e.g., 812-5b) for delaying outputs of the output register circuitry by the systolic delay time interval.

Yet further in such a case, the DSP block circuitry may yet further include circuitry (e.g., connections from outputs of 812-5b to inputs of next downstream adder 511 (not shown in FIG. 8)) for applying outputs of the second systolic delay circuitry (e.g., 812-5b) to a second other instance of said DSP block circuitry (e.g., not shown but to the left of 500b' in FIG. 8) as said third plurality of parallel signals of said second other instance. In such a case, the DSP block circuitry may be used in combination with (1) circuitry (e.g., x3) for applying a succession of input signal samples to the first multiplier circuitry (e.g., 505), (2) circuitry (e.g., 820-3 and 822-3) for delaying each of the input signal samples by a time period equal to the sum of (a) duration of each of the input signal samples in the succession and (b) the systolic delay time interval, and (3) circuitry (e.g., x4) for applying outputs of the circuitry for delaying to the second multiplier circuitry (e.g., 506). Yet further in such a case, the systolic delay time interval is preferably equal to the duration of each of the input samples (e.g., x[n]) in the succession.

DSP block circuitry as is being recapitulated here may further include circuitry (e.g., 640, 642) for controllably allowing the above-mentioned first plurality of parallel output signals to bypass the first systolic delay circuitry (e.g., 812-3a). Similarly, DSP block circuitry as is being recapitulated here may further include (e.g., 640, 642) for controllably allowing the outputs of the output register circuitry (e.g., 512) to bypass the second systolic delay circuitry (e.g., 812-5b).

In DSP block circuitry as is being recapitulated here, the adder circuitry (e.g., 511) may include means (e.g., 508) for additively combining the outputs of the first systolic delay circuitry (e.g., 812-3a) and the second plurality of parallel output signals (e.g., outputs of 506) to produce a plurality of parallel intermediate signals (e.g., outputs of 508). The adder circuitry may further include means (e.g., 510) for additively combining the plurality of parallel intermediate signals and the third plurality of parallel signals (e.g., outputs of 812-3b).

DSP block circuitry as is being recapitulated here may further include third multiplier circuitry (e.g., 1007 in FIG. 12) for producing a fourth plurality of parallel output signals indicative of a third multiplication result. Such DSP block circuitry may still further include third systolic delay circuitry (e.g., 812-3a in FIG. 12) for delaying the fourth plurality of parallel output signals by a second systolic delay time interval which is a fraction of the systolic delay time interval, and wherein the adder circuitry (e.g., 1011 in FIG. 12) additionally adds outputs of the third systolic delay circuitry (e.g., 812-3a in FIG. 12). By way of explanation of the phrase "fraction of the systolic delay time interval," it will be noted in FIG. 12 that the systolic delay of the outputs of "first multiplier circuitry" 1005 is three units (or multiples) of systolic delay (produced by three sets of systolic delay registers 812-1a, 1b, and 1c connected in series). The systolic delay of the outputs of "third multiplier circuitry" 1007 is one unit of systolic delay (produced by systolic delay registers 812-3a). Therefore, if (as earlier in this recapitulation), multiplier 1005 is "the first multiplier circuitry" whose outputs go to "first systolic delay circuitry [812-1a, 1b, 1c] for delaying the [applied signals] by a systolic time delay interval" (in this case three units of systolic delay), then the just-mentioned "third systolic delay circuitry" 812-3a in FIG. 12 delays the outputs of multiplier 1007 by only a fraction (i.e., one-third) of the systolic delay imparted to the outputs of multiplier 1005.

To some extent further recapitulating and extending the foregoing, digital signal processing ("DSP") block circuitry (e.g., 500b'' in FIG. 10) in accordance with certain other possible aspects of the invention may include first multiplier circuitry (e.g., 505) for producing a first plurality of parallel output signals indicative of a first multiplication product of a plurality of parallel multiplicand signals (e.g., x3) and a plurality of parallel multiplier signals (e.g., C3). The DSP block circuitry may further include first systolic delay circuitry (e.g., 812-3a2 and/or 812-3a1) for delaying at least one of (1) the plurality of parallel multiplicand signals and (2) the plurality of parallel multiplier signals by a systolic delay time interval. The DSP block circuitry may still further include second multiplier circuitry (e.g., 506) for producing a second plurality of parallel output signals indicative of a second multiplication product. The DSP block circuitry may yet further include adder circuitry (e.g., 511) for adding the first and second pluralities of output signals and a third plurality of parallel signals indicative of a data value received from a first other instance (e.g., 500a'') of said DSP block circuitry. The DSP block circuitry may still further include output register circuitry (e.g., 512) for registering output signals of the adder circuitry (e.g., 511). The DSP block circuitry may yet further include second systolic delay circuitry (e.g., 812-5b) for delaying outputs of the output register circuitry (e.g., 512) by the systolic delay time interval.

DSP block circuitry such as recapitulated above may further include circuitry (e.g., output leads from 812-5b) for applying outputs of the second systolic delay circuitry (e.g., 812-5b) to a second other instance of said DSP block circuitry (e.g., another instance (not shown) of circuitry like 500'' to the left of 500b'' in FIG. 10) as said third plurality of parallel signals of said second other instance.

In DSP block circuitry such as recapitulated above, the first systolic delay circuitry (e.g., 812-3a2 and/or 812-3a1) may delay both the plurality of parallel multiplicand signals (e.g., x3) and the plurality of parallel multiplier signals (e.g., C3) by the systolic delay time interval.

DSP block circuitry such as recapitulated above may be used in combination with (1) circuitry for applying a succession of input signal samples to the first systolic delay circuitry (e.g., 812-3a2) as the multiplicand signals (e.g., x3), (2) circuitry (e.g., 830-3 and 822-3) for delaying each of the input signal samples by a time period equal to the sum of (a) duration of each of the input signal samples in the succession, and (b) the systolic delay time interval, and (3) circuitry (e.g., x4) for applying outputs of the circuitry for delaying (e.g., 820-3 and 822-3) to the second multiplier circuitry (e.g., 506).

In DSP block circuitry such as recapitulated above, the systolic delay time interval is preferably equal to the duration of each of the input signal samples in the succession.

DSP block circuitry such as recapitulated above may further include circuitry (e.g., 640, 642) for controllably allowing signals to bypass the first systolic delay circuitry (e.g., 812-3a2 and/or 812-3a1). Similarly, DSP block circuitry as recapitulated above may further include circuitry (e.g., 640, 642) for controllably allowing signals to bypass the second systolic delay circuitry (e.g., 812-5b).

In DSP block circuitry such as recapitulated above, the adder circuitry may include means (e.g., 508) for additively combining the first and second pluralities of output signals to produce a plurality of parallel intermediate signals (e.g., outputs of 508). The adder circuitry may further include means (e.g., 510) for additively combining the plurality of parallel intermediate signals and the third plurality of parallel signals (e.g., outputs of 812-3b).

DSP block circuitry such as recapitulated above may further include third multiplier circuitry (e.g., 1007 in FIG. 13) for producing a fourth plurality of parallel output signals indicative of a third multiplication product of a third plurality of parallel multiplicand signals (e.g., x3 in FIG. 13) and a third plurality of parallel multiplier signals (e.g., C3 in FIG. 13). In such a case, the DSP block circuitry may still further include third systolic delay circuitry (e.g., 812-3a2 and/or 812-3a1 in FIG. 13) for delaying at least one of (1) the third plurality of parallel multiplicand signals (e.g., x3 in FIGS. 13) and (2) the third plurality of parallel multiplier signals (e.g., C3 in FIG. 13) by a second systolic delay time interval which is a fraction of the systolic delay time interval, and wherein the adder circuitry (e.g., 1011 in FIG. 13) additionally adds the fourth plurality of parallel output signals. This reference to "a fraction of the systolic delay time interval" is similar to previous use of this type of language. In this case it refers to the fact that in FIG. 13 either or both inputs to multiplier 1007 have one-third the systolic delay given to either or both inputs to multiplier 1005.

It will be understood that the foregoing is only illustrative of the principles of this disclosure, and that various modifications can be implemented by those skilled in the art without departing from the scope and spirit of the invention. For example, the parameter N has sometimes been referred to as having the value 18. But this is only an example, and larger or smaller values (e.g., 20 or 16, etc.) can instead be used for parameter N.

It will also be understood that all structure shown herein is typically electrical circuitry, and that all functions described herein (e.g., multiplication, addition, etc.) are performed by such circuitry operating on electrical signals indicative of digital data words. Such digital data words may be referred to as input data signal samples, multiplicands, multipliers, products, sums, etc., but they are all typically embodied as electrical signals. Terms like "first," "second," "third," etc., may sometimes be used herein solely as arbitrary identifiers for different occurrences of somewhat similar elements. In such contexts, use of these arbitrary identifiers does not imply any particular order of the elements referred to. Nor does use of a term like "first" by itself necessarily imply that a "second" such element is also present. Similarly, use of a term like "second" does not by itself necessarily imply that a "first" such element is also present.

The invention claimed is:

1. Digital signal processing ("DSP") block circuitry comprising:
   first multiplier circuitry for producing a first plurality of parallel output signals indicative of a first multiplication product;
   first systolic delay circuitry for delaying the first plurality of parallel output signals by a systolic delay time interval;
   second multiplier circuitry for producing a second plurality of parallel output signals indicative of a second multiplication product; and
   adder circuitry for adding (1) outputs of the first systolic delay circuitry, (2) the second plurality of parallel output signals, and (3) a third plurality of parallel signals indicative of a data value received from a first other instance of said DSP block circuitry.

2. The DSP block circuitry defined in claim 1 wherein the adder circuitry produces a fourth plurality of parallel signals indicative of a sum from the adding.

3. The DSP block circuitry defined in claim 2 further comprising:
   output register circuitry for registering the fourth plurality of parallel signals.

4. The DSP block circuitry defined in claim 3 further comprising:
   second systolic delay circuitry for delaying outputs of the output register circuitry by the systolic delay time interval.

5. The DSP block circuitry defined in claim 4 further comprising:
   circuitry for applying outputs of the second systolic delay circuitry to a second other instance of said DSP block circuitry as said third plurality of parallel signals of said second other instance.

6. The DSP block circuitry defined in claim 5 in combination with:
   circuitry for applying a succession of input signal samples to the first multiplier circuitry;
   circuitry for delaying each of the input signal samples by a time period equal to the sum of (1) duration of each of the input signal samples in the succession, and (2) the systolic delay time interval; and
   circuitry for applying outputs of the circuitry for delaying to the second multiplier circuitry.

7. The DSP block circuitry defined in claim 6 wherein the systolic delay time interval is equal to the duration of each of the input signal samples in the succession.

8. The DSP block circuitry defined in claim 1 further comprising:
   circuitry for controllably allowing the first plurality of parallel output signals to bypass the first systolic delay circuitry.

9. The DSP block circuitry defined in claim 3 further comprising:
   circuitry for controllably allowing the outputs of the output register circuitry to bypass the second systolic delay circuitry.

10. The DSP block circuitry defined in claim 1 wherein the adder circuitry comprises:
    means for additively combining the outputs of the first systolic delay circuitry and the second plurality of parallel output signals to produce a plurality of parallel intermediate signals; and
    means for additively combining the plurality of parallel intermediate signals and the third plurality of parallel signals.

11. The DSP block circuitry defined in claim 1 further comprising:
    third multiplier circuitry for producing a fourth plurality of parallel output signals indicative of a third multiplication result;
    and third systolic delay circuitry for delaying the fourth plurality of parallel output signals by a second systolic delay time interval which is a fraction of the systolic delay time interval; and wherein the adder circuitry additionally adds outputs of the third systolic delay circuitry.

12. The DSP block circuitry defined in claim 6 wherein the circuitry for delaying each of the input signal samples by a time period equal to the sum of (1) duration of each of the input signal samples in the succession, and (2) the systolic delay time interval is part of the DSP block circuitry.

* * * * *